United States Patent
Brown et al.

(10) Patent No.: US 8,804,029 B2
(45) Date of Patent: Aug. 12, 2014

(54) VARIABLE FLASH CONTROL FOR IMPROVED IMAGE DETECTION

(75) Inventors: Shawn M. Brown, Sammamish, WA (US); John A. Yovin, Woodinville, WA (US)

(73) Assignee: Microsoft Corporation

( * ) Notice: Subject to any disclaimer, the term of this patent is extended or adjusted under 35 U.S.C. 154(b) by 47 days.

(21) Appl. No.: 13/530,134

(22) Filed: Jun. 22, 2012

(65) Prior Publication Data

US 2013/0342757 A1 Dec. 26, 2013

(51) Int. Cl.
*H04N 5/222* (2006.01)
*G03B 9/70* (2006.01)

(52) U.S. Cl.
USPC .......................................... 348/371; 396/166

(58) Field of Classification Search
USPC ............................ 348/255, 370, 371; 396/166
See application file for complete search history.

(56) References Cited

U.S. PATENT DOCUMENTS

| | | | |
|---|---|---|---|
| 6,546,203 B2 * | 4/2003 | Hofer | 396/155 |
| 7,414,666 B2 * | 8/2008 | Yamaguchi | 348/371 |
| 7,589,783 B2 * | 9/2009 | Simpkins et al. | 348/370 |
| 7,961,214 B2 * | 6/2011 | Grodevant | 348/69 |
| 2003/0048490 A1 | 3/2003 | Yanagihara et al. | |
| 2009/0034788 A1 | 2/2009 | Sim et al. | |
| 2010/0088099 A1 | 4/2010 | Kurzweil et al. | |
| 2010/0331043 A1 | 12/2010 | Chapman et al. | |
| 2011/0150346 A1 | 6/2011 | Panetta | |
| 2011/0192893 A1 | 8/2011 | Waugh et al. | |
| 2012/0002045 A1 | 1/2012 | Tony et al. | |

OTHER PUBLICATIONS

Chen, et al., "Automatic Detection and Recognition of Signs from Natural Scenes", Retrieved at <<http//www.jdl.ac.cn/user/xlchen/Paper/TIP04.pdf>>, IEEE Transactions on Image Processing, vol. 13, No. 1, Jan. 2004, pp. 87-99.

\* cited by examiner

*Primary Examiner* — Timothy J Henn
(74) *Attorney, Agent, or Firm* — Sung Kim; Andrew Sanders; Micky Minhas (57) ABSTRACT

Example apparatus and methods concern controlling a variable flash to improve image detection. One example apparatus includes a digital camera and a variable flash configured to be controllable to operate at different selected illumination levels. The apparatus may be configured to identify a current imaging condition associated with the digital camera and to then determine a lux setting for the variable flash as a function of the current imaging condition. The flash may then be controlled as a function of the lux setting for subsequent image acquisition. The acquisition, analysis, and flash control may be exercised until a desired illumination is achieved. In one embodiment, determining the current imaging condition may include analyzing a frame acquired from the digital camera for attributes including image brightness, and edge detectability. In one embodiment, input from a light sensor may also be considered.

14 Claims, 6 Drawing Sheets

VARIABLE FLASH CONTROL FOR IMPROVED IMAGE DETECTION

BACKGROUND

Mobile computing devices (e.g., smart phones, tablets) are ubiquitous. Additionally, the number and variety of tasks performed by mobile computing devices continue to expand. One task users increasingly demand from their mobile computing devices is high quality imaging (e.g., photography). In some cases, an image may be acquired to record an event. But in other cases, an image may be a means to an end. For example, the image may be input to a downstream application (e.g., optical character recognition, image detection) to produce some other result. The quality of the result produced by the downstream application may depend on the quality of the image provided to that downstream application. The quality of the image may in turn depend on the lighting conditions under which the image was acquired. Sub-optimal lighting conditions may produce sub-optimal images.

Conventional systems may have treated image acquisition and image processing as unrelated events, where the image is acquired by one process and then image optimization is handled as a discrete event by another process. Discrete processes may not consider resampling images after modifying an image acquisition environment. These isolated processes may be inadequate for some purposes. Consider a tourist visiting a restaurant in Paris. The tourist may not speak French but may want to order from a French menu. The tourist may therefore take an image of the menu, intending to provide it to a French to English translation application. Before the image is provided for translation, an optical character recognition (OCR) application may attempt to sharpen up the image, to achieve a desired contrast, to achieve a desired edge detection, and to identify characters. However, the lighting conditions in the restaurant may have been sub-optimal, or barely even acceptable, and thus the success rate for both the OCR and then the French to English translation may be inadequate.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods improve quality for images acquired from a camera on a mobile computing device. The mobile computing device may be configured with a variable flash that can be controlled to increase or decrease the lux or light intensity of a surface or object to facilitate improved detection of items (e.g., characters) on that surface or object. The mobile computing device may also be configured with a light sensor that can provide information for controlling whether to trigger the flash, and if so, to what level. The mobile computing device may also be configured with logic that analyzes metrics (e.g., brightness, contrast, character readability) of a captured image to facilitate controlling the flash or the flash level. A first image may be acquired and then analyzed. Based on the analysis, the flash may be controlled and a second image acquired and then analyzed. An example mobile computing device may cycle between acquisition and analysis until a desired image quality is achieved.

Example apparatus and methods facilitate adapting lighting based on an image received. Rather than treating image acquisition and image correction as separate events that are performed to completion one after another, an acquisition apparatus or process can communicate with a correction apparatus or process that generates control signals for producing a higher quality image. Improving the quality of the acquired image may in turn lead to improved downstream results in OCR, image detection applications, and other applications. Example apparatus and methods may analyze an image being received by a mobile computing device and then change the lighting, provide recommendations for improving lighting that may produce a superior image, or take other actions.

Example apparatus and methods may control a variable flash on a mobile computing device. In one embodiment, the control may be exercised in response to input from, for example, a lux meter on the mobile device. In another embodiment, the control may be exercised in response to real-time or near-real-time analysis of an image being produced by the imaging device (e.g., camera) on the mobile computing device. In one embodiment, the logic for controlling the flash may reside on the mobile computing device. In another embodiment, the logic for controlling the flash may reside in an external service and the mobile computing device may communicate with the service during or after acquiring an image or series of calibrating images.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods control a flash associated with a mobile computing device to facilitate improving image detection. In one embodiment, the flash may be controlled based on information received from a sensor (e.g., lux meter, light sensor, infrared sensor, other non-visible light sensor). In another embodiment, the flash may be controlled based on information determined during image analysis (e.g., brightness, contrast, color saturation, character recognition success, edge detection success). In yet another embodiment, the flash may be controlled based both on information received from a sensor and on information determined during image analysis. Controlling a variable flash may include turning the flash on or off. Controlling a variable flash may also include not only turning the flash on or off, but also controlling flash intensity.

Example apparatus and methods may perform image analysis frame by frame on frames received from a live viewfinder on a camera associated with the mobile computing device. Since frames may be received very quickly (e.g., 1 every 10 ms), example apparatus and methods may alternate between acquisition, analysis, and control until a desired result is achieved. If a desired result cannot be achieved, then a signal may be provided indicating that the result cannot be achieved. The signal may be accompanied by additional information (e.g., suggestions for additional lighting, suggestions for moving the camera). Example mobile computing devices include, but are not limited to, smart phones, tablets, portable devices, scanning wands, computers, and other visual language code scanners.

In one embodiment, when a user initiates a visual detection action, an example method may input values associated with the detection including, but not limited to, a flash position, a sensor position, a lens position, relative positions between the flash, sensor, & lens, and a sensor reading. The example method may then determine whether the combination of inputs indicate that a threshold for image recognition is satisfied. The threshold may be, for example, a sufficient lux rating. If the inputs indicate a threshold has been met, then image acquisition may proceed. But if the inputs indicate that a threshold has not been met, then a setting for the flash may be computed. Computing the setting for the flash may include, for example, accessing a value from a lookup table, computing a result for a formula, receiving a signal from a circuit, or other actions. The example method then controls the flash to operate at the programmed intensity. For a binary flash that is either on or off, the intensity would be set to "on". For a variable flash that has a range of intensities, the intensity could be more finely programmed to a desired lux setting. Since a binary flash may saturate an image under close proximity, the example method may determine that a better image may be acquired without the flash than with the flash.

In one embodiment, readings from a sensor may not be employed. In this embodiment, a frame may be acquired under a first condition (e.g., flash setting), the frame may be analyzed for metrics including, but not limited to, edge detection, character detection, and brightness, and then the flash setting may be adjusted based on the metrics. Frames may be acquired, metrics analyzed, and the flash controlled until a desired condition is achieved. In one embodiment, the frame may be analyzed by logic located in the device acquiring the frame. In another embodiment, the frame may be analyzed by logic located in other locations.

In one embodiment, a combination of sensor readings and image analysis metrics may be employed. Once again, processing that determines how to control the flash may be performed on the device, in the cloud, or in a combination thereof. In these various embodiments, it may be determined that reprogramming the flash alone may be inadequate to produce a desired result. In this situation, example methods or apparatus may provide a signal or instructions to the user. For example, the user may be instructed to move the camera closer to the object to be imaged, the user may be instructed to hold the camera at a different angle, the user may be instructed to find an additional source of illumination, or may be given the option to proceed anyway, knowing that the result may be sub-optimal. Performing flash or other environmental correction may be used in conjunction with image correction and therefore post processing actions may be used for further improvement.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 1:
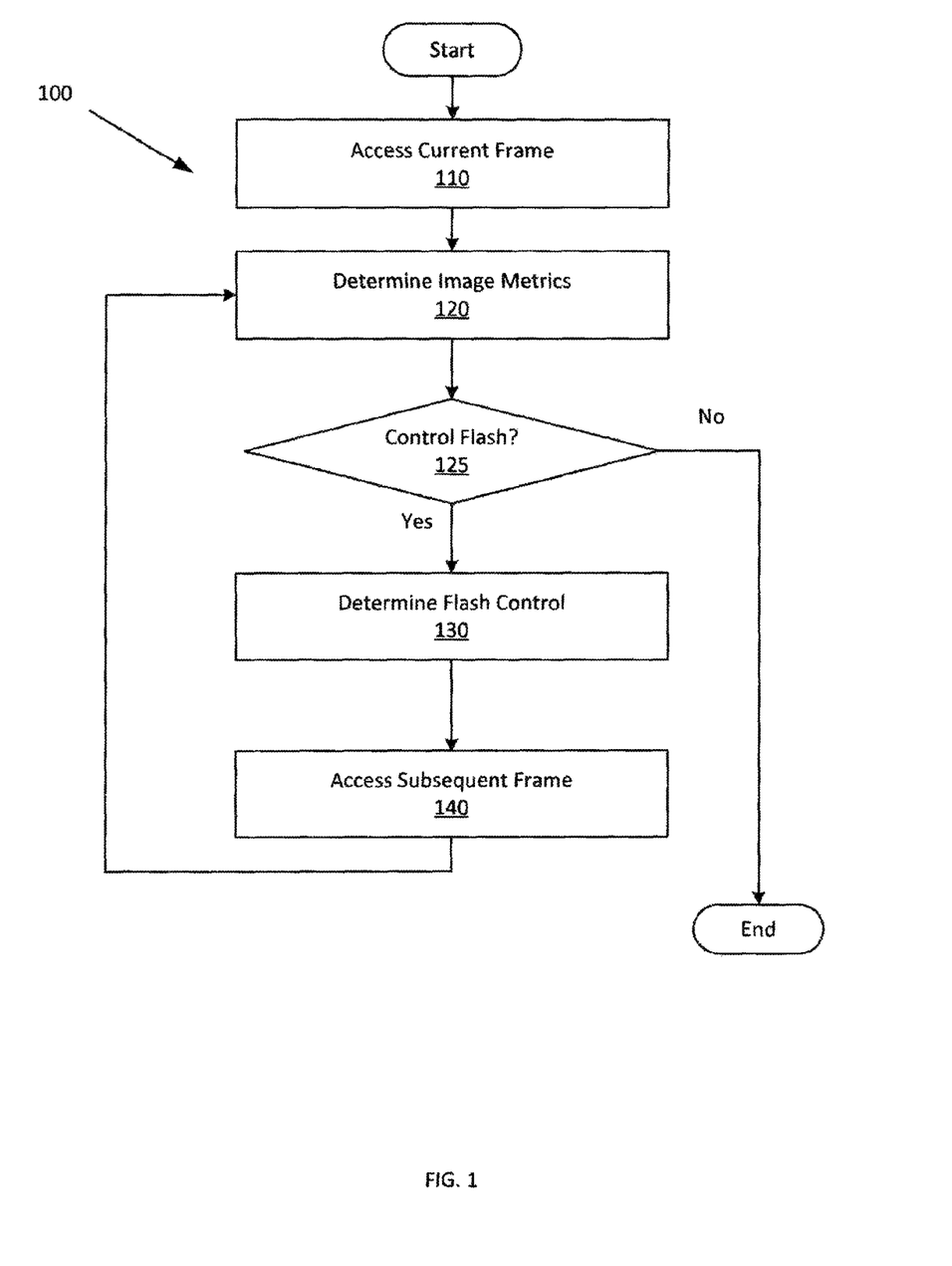
FIG. 1 illustrates an example method associated with variable flash control for improved image detection.

FIG. 1 illustrates an example method 100 associated with variable flash control for improved image detection. Method 100 may include, at 110, accessing a current frame acquired by a camera associated with a mobile computing device. Accessing the current frame may include, for example, receiving the frame as an input, receiving a pointer to the current frame, having the current frame deposited in a memory, having the current frame placed in a buffer, and other actions. The frame may be, for example, a digital image acquired by a digital camera. The frame may also be, for example, a sample of a view available in a live viewfinder. This image may be a captured isolated image, as in a picture taken, or could be a sample from a live stream of images.

Method 100 may also include, at 120, determining one or more imaging metrics for the current frame. The imaging metrics may include, for example, edge detectability, brightness, and saturation. Edge detectability concerns the ability to recognize where one item (e.g., character, portion of a character) begins and ends. Brightness concerns how dark or how light an image appears. Saturation concerns the level of contrast within the image. Edge detectability may depend on brightness or saturation. While edge detectability and brightness/saturation are described, other imaging metrics may also be considered.

Method 100 may also include, at 125, determining whether to control the variable flash. If the imaging metrics were acceptable, then no control may be desired. But if the imaging metrics were unacceptable, then method 100 may proceed to 130.

Method 100 may also include, at 130, selectively controlling a variable flash associated with the mobile computing device. The control will be based, at least in part, on the imaging metrics computed at 120. The control will be exercised during acquisition of a subsequent frame. Thus, the variable flash will be controlled to operate the flash at a desired illumination level when acquiring the subsequent frame. Controlling the variable flash may include, for example, programming a control variable for the flash, writing a control value into a control register, controlling a voltage applied on a control circuit, and other actions.

Method 100 may also include, at 140, accessing the subsequent frame acquired by the camera and treating the subsequent frame as the current frame. Treating the subsequent frame as the current frame may include, for example, replacing the current frame with the subsequent frame, updating an address of the frame to be treated as the current frame, updating a pointer that points to the current frame, and other actions.

Method 100 may then return to 120, where image metrics are recomputed. At 125, in addition to determining whether imaging metrics have been satisfied, the action may include determining whether a termination condition has been met. The termination condition may indicate that a desired illumination level has been achieved, that a desired edge detection has been achieved, that a desired illumination has not been achieved, or other factors. If a desired property cannot be achieved, then the termination condition may involve proceeding with a sub-optimal signal, failure, and sending a signal indicating the failure. In one embodiment, the termination condition may include having accessed a pre-determined number of frames without being able to achieve a desired property. In another embodiment, the termination condition may include having unsuccessfully tried to achieve desired lighting for a pre-determined amount of time. Other termination conditions may be considered.

While FIG. 1 illustrates various actions occurring in serial, it is to be appreciated that various actions illustrated in FIG. 1 could occur substantially in parallel. By way of illustration, a first process could acquire frames, a second process could compute imaging metrics, and a third process could control the variable flash. While three processes are described, it is to be appreciated that a greater or lesser number of processes could be employed and that lightweight processes, regular processes, threads, and other approaches could be employed.

Figure 2:
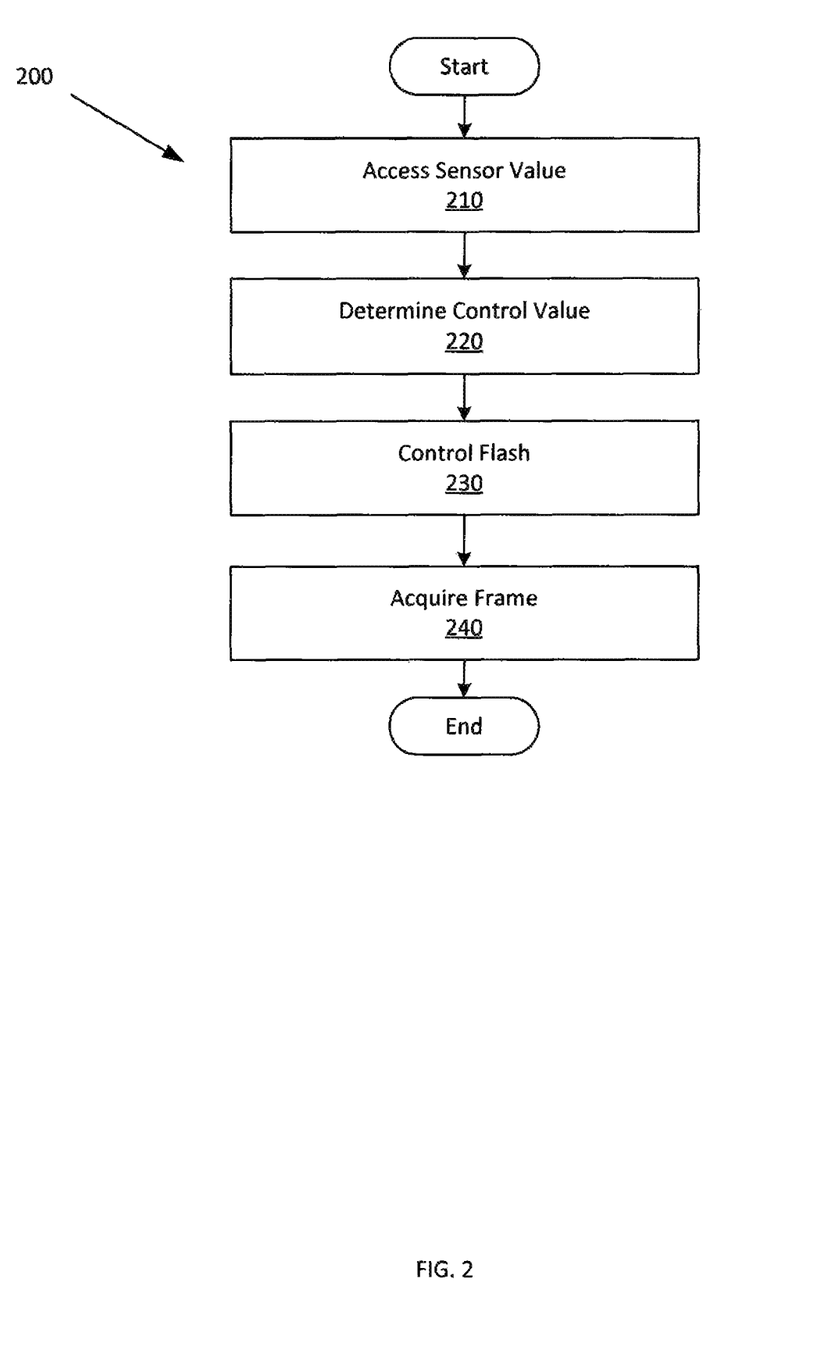
FIG. 2 illustrates an example method associated with variable flash control for improved image detection.

FIG. 2 illustrates an example method 200 associated with variable flash control for improved image detection. Where method 100 was based on image analysis, method 200 is based on analyzing information from a light sensor. In one embodiment, the light sensor may acquire light in the visible light spectrum. In another embodiment, the light sensor may acquire light in the non-visible light spectrum (e.g., infrared, ultra-violet). In yet another embodiment, light from both the visible and non-visible spectra may be acquired and analyzed. Method 200 may include, at 210, accessing a sensor value provided by a light sensor associated with a mobile computing device. The sensor value may be, for example, an illumination value, a lux value, a brightness value, or other values. One example other value may measure infrared power to surface area using Watts per Steradian.

Method 200 may also include, at 220, determining a first control value for a variable flash associated with the mobile computing device as a function of the sensor value. The first control value may be used to make the flash brighter, to make the flash less bright, to turn the flash on, to turn the flash off, or other actions.

Method 200 may also include, at 230, selectively controlling the variable flash based, at least in part, on the first control value. Selectively controlling the variable flash includes making the flash operate at the controlled value when a subsequent image is acquired. Thus, the first control value computed at 220 is configured to control the mobile computing device to operate the variable flash at a desired illumination level when acquiring a subsequent frame at 240. Operating the variable flash at the desired illumination level may include, for example, programming a value into a control region, providing a voltage on a control line, writing a value into a register, or other actions.

Figure 3:
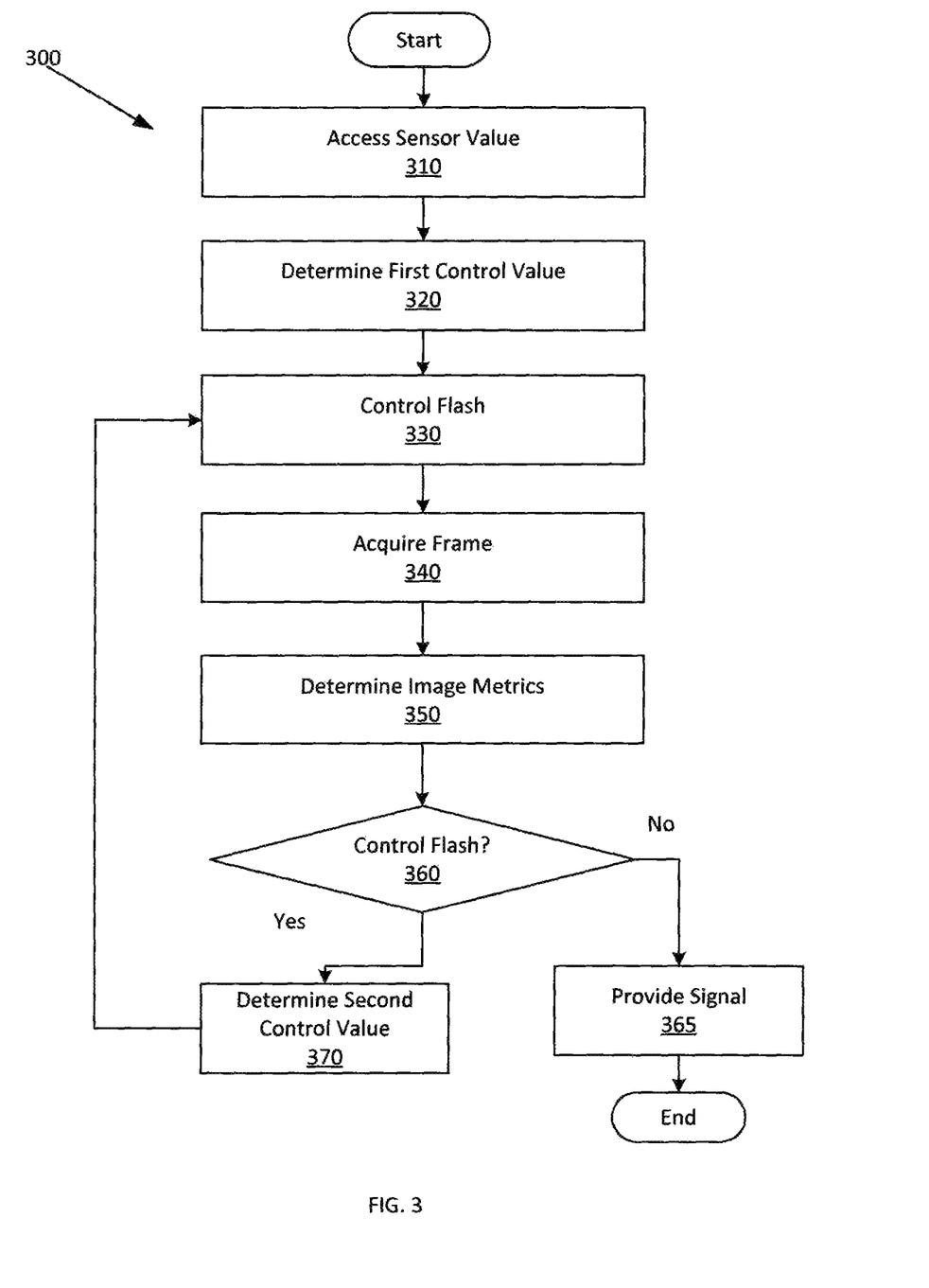
FIG. 3 illustrates an example method associated with variable flash control for improved image detection.

FIG. 3 illustrates an example method 300 associated with variable flash control for improved image detection. Method 300 combines the sensor based control of method 200 with the image analysis based control of method 100. Thus, method 300 includes, at 310, accessing a sensor value provided by a light sensor associated with a mobile computing device. The sensor value may be, for example, an illumination value, a lux value, a brightness value, or other values.

Method 300 may also include, at 320, determining a first control value for a variable flash associated with the mobile computing device. The first control value may be computed as a function of the sensor value. The first control value may be used to make the flash brighter, to make the flash less bright, to turn the flash on, to turn the flash off, or other actions.

Method 300 may also include, at 330, selectively controlling the variable flash based, at least in part, on the first control value. Selectively controlling the variable flash includes making the flash operate at the controlled value when a subsequent image is acquired. Thus, the first control value computed at 320 is configured to control the mobile computing device to operate the variable flash at a desired illumination level when acquiring a subsequent frame at 340. Operating the variable flash at the desired illumination level may include, for example, programming a value into a control region, providing a voltage on a control line, writing a value into a register, or other actions.

Method 300 may proceed, at 350, to determine one or more imaging metrics for the current frame. The imaging metrics may include, for example, brightness, edge detectability, contrast, and other attributes. With the imaging metrics computed, method 300 may then proceed, at 360, to determine whether to control the flash. The determination about controlling the flash may include determining whether a termination condition has been met. The termination condition may include successful situations (e.g., adequate performance achieved) and unsuccessful situations (e.g., too many tries, too long trying without success).

If the determination at 360 is to conclude, then method 300 may terminate. In one embodiment, before terminating, method 300 may include, at 365, providing a signal about unsuccessful termination. In one embodiment, the signal may convey information about acquiring additional illumination, moving the camera, moving the object to be imaged, and other information.

But if the determination at 360 is to proceed, then method 300 may proceed at 370 by determining a second control value for the variable flash as a function of the one or more imaging metrics. Method 300 may then selectively control the variable flash at 330 based, at least in part, on the second control value. The variable flash will be controlled during acquisition of the next frame at 340.

In one embodiment, method 300 may acquire additional information upon which control values can be based. This additional information may include a set of hardware locations associated with the mobile computing device. The set of hardware locations may describe, for example, the position of a lens on the mobile device, the position of a sensor on the mobile device, the position of a flash on the mobile device, and the positions of these devices relative to each other or an object to be imaged. While these positions may be known to a mobile computing device itself, these positions may not be known by an external service that is consulted for additional processing.

In one embodiment, determining the first control value at 320 may be a function of both the sensor value and hardware locations. Similarly, determining the second control value at 370 may also be a function of the one or more imaging metrics and the set of hardware locations.

In one embodiment, the control values may be computed on a mobile device performing method 300. Thus, in one embodiment, method 300 may include controlling the mobile computing device to determine the one or more imaging metrics for the frame. In another embodiment, the mobile device performing method 300 may seek assistance from an external service. The external service may be located, for example, in the cloud. In this embodiment, method 300 may include controlling the mobile computing device to communicate the current frame to a service, controlling the mobile computing device to request that the service compute the one or more imaging metrics, and then receiving the one or more imaging metrics from the service.

In one example, a method may be implemented as computer executable instructions. Thus, in one example, a computer-readable storage medium may store computer executable instructions that if executed by a machine (e.g., computer) cause the machine to perform methods described herein including methods 100, 200 or 300. While executable instructions associated with the above methods are described as being stored on a computer-readable storage medium, it is to be appreciated that executable instructions associated with other example methods described herein may also be stored on a computer-readable storage medium. In different embodiments the example methods described herein may be triggered in different ways. In one embodiment, a method may be triggered manually by a user of a mobile computing device. In another example, a method may be triggered automatically when a scan is initiated.

Figure 4:
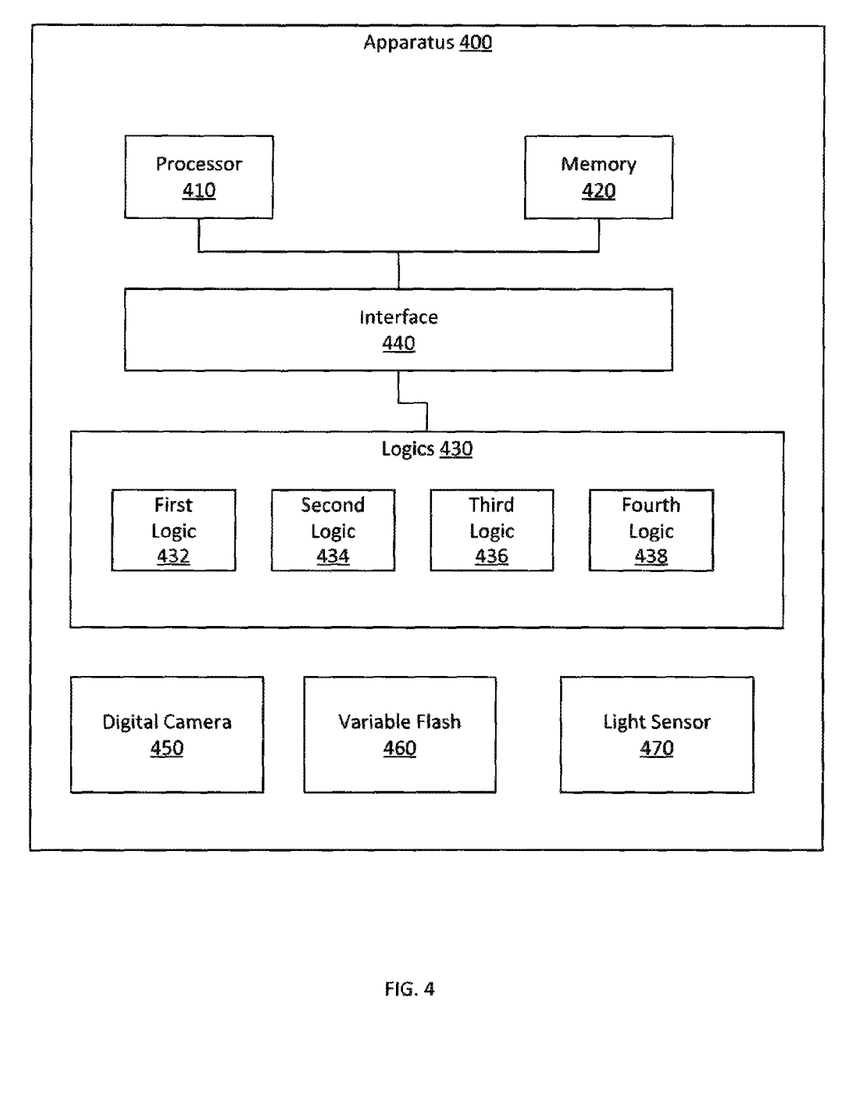
FIG. 4 illustrates an example apparatus having variable flash control for improved image detection.

FIG. 4 illustrates an apparatus 400 that includes a processor 410, a memory 420, a set 430 of logics and an interface 440 that connects the processor 410, the memory 420, and the set 430 of logics. Apparatus 400 also includes a digital camera 450 and a variable flash 460. Variable flash 460 may be configured to be controllable to operate at a selected illumination level. In one embodiment, apparatus 400 may also include a light sensor 470. While camera 450, flash 460, and sensor 470 are illustrated as being part of apparatus 400, in different embodiments the camera 450, flash 460, or sensor 470 may be external to the apparatus. For example, the camera 450, flash 460, or sensor 470 may be separate components that are connected to apparatus 400 by, for example, a USB connection or a Wi-Fi connection. While a single camera 450, single flash 460, and single sensor 470 are illustrated, in different embodiments, apparatus 400 may include one or more cameras, one or more flashes, one or more sensors, or combinations thereof.

In one embodiment the apparatus 400 may be a general purpose computer that has been transformed into a special purpose computer through the inclusion of the set 430 of logics. The set 430 of logics may be configured to facilitate controlling the variable flash 460 to improve image detection. For example, the set 430 of logics may be configured to control the illumination level of the controllable flash 460.

In one embodiment, the methods described herein may be performed by apparatus 400. Apparatus 400 may interact with other apparatus, processes, and services through, for example, a computer network.

The set 430 of logics may include a first logic 432 that is configured to identify a current imaging condition experienced by the digital camera 450. In one embodiment, the first logic 442 may be configured to determine the current imaging condition based on a frame acquired by the digital camera 450. In this embodiment, determining the current imaging condition may include determining attributes including, but not limited to, a brightness of the frame, and an edge detectability of the frame.

When the apparatus 400 includes light sensor 470, the first logic 432 may be configured to determine the current imaging condition based on an input from the light sensor 470. In one embodiment, the first logic 432 may be configured to determine the current imaging condition based on an input from the light sensor and on a frame acquired from the digital camera.

The set 430 of logics may also include a second logic 434 that is configured to compute a lux setting for the variable flash 460 as a function of the current imaging condition. The set 430 of logics may also include a third logic 436 that is configured to control the variable flash 460 as a function of the lux setting.

Lux (lx) is the SI unit of illuminance and luminous emittance. Lux measures luminous flux per unit area. Lux is used in photometry as a measure of the intensity, as perceived by the human eye, of light on a surface. Lux may consider the power at different wavelengths as weighted according to a luminosity function. The luminosity function may provide a standardized model of human visual brightness perception. Illuminance is a measure of how much luminous flux is spread over a given area. Luminous flux, which is measured in lumens, is a measure of the total amount of visible light present. Illuminance is a measure of the intensity of illumination on a surface. A given amount of light will illuminate a surface more dimly if it is spread over a larger area, so illuminance is inversely proportional to area. One lux is equal to one lumen per square meter: $1 \text{ lx} = 1 \text{ lm/m}^2 = 1 \text{ cd·sr·m}^{-2}$.

The positions of the lens, flash, and meter, and the relative positions of the lens, flash, and meter, may be considered in calculations for determining the intensity of the flash. For example, if the sensor is on the front of a device and needs to control the intensity of a flash on the opposite side of the device, then a first lux detection approach may be employed. But if the sensor is on the same side of the device as the flash, then a second, different lux detection approach may be employed. By way of illustration, one lux detection approach may consider that light is additive, detect the current lux reading (e.g., 30 Lux) and determine an amount to be added to produce a desired lux reading (e.g., 70 Lux). In this situation, the flash may be controlled to add 40 Lux to the environment.

The set 430 of logics may also include a fourth logic 438 that is configured to control the digital camera 450 to acquire frames and configured to control the first logic 432, the second logic 434, and the third logic 436 to continue to operate until a termination condition is achieved. In one embodiment, the termination condition is achieved when a desired image detection quality, brightness, contrast, character detection, edge detection, or other parameter satisfies a threshold. In one embodiment, the termination condition is achieved upon determining that a desired image quality cannot be attained. When a failure termination condition is found, the fourth logic 438 is configured to provide a failure signal to a user of the apparatus 400.

In one embodiment, the fourth logic 438 is configured to control the camera 450 to acquire an image while controlling the variable flash 460 to operate at an illumination level determined by the lux level.

In different embodiments, some processing may be performed on the apparatus 400 and some processing may be performed by an external service. In one example, the first logic 432 may be configured to determine the current imaging condition on the apparatus 400, and the second logic 434 may be configured to determine the lux setting on the apparatus. But in another example, the first logic 432 may be configured to request a determination of the current imaging condition from a service located off the apparatus 400. Similarly, the second logic 434 may be configured to request a determination of the lux setting from a service located off the apparatus 400.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 5:
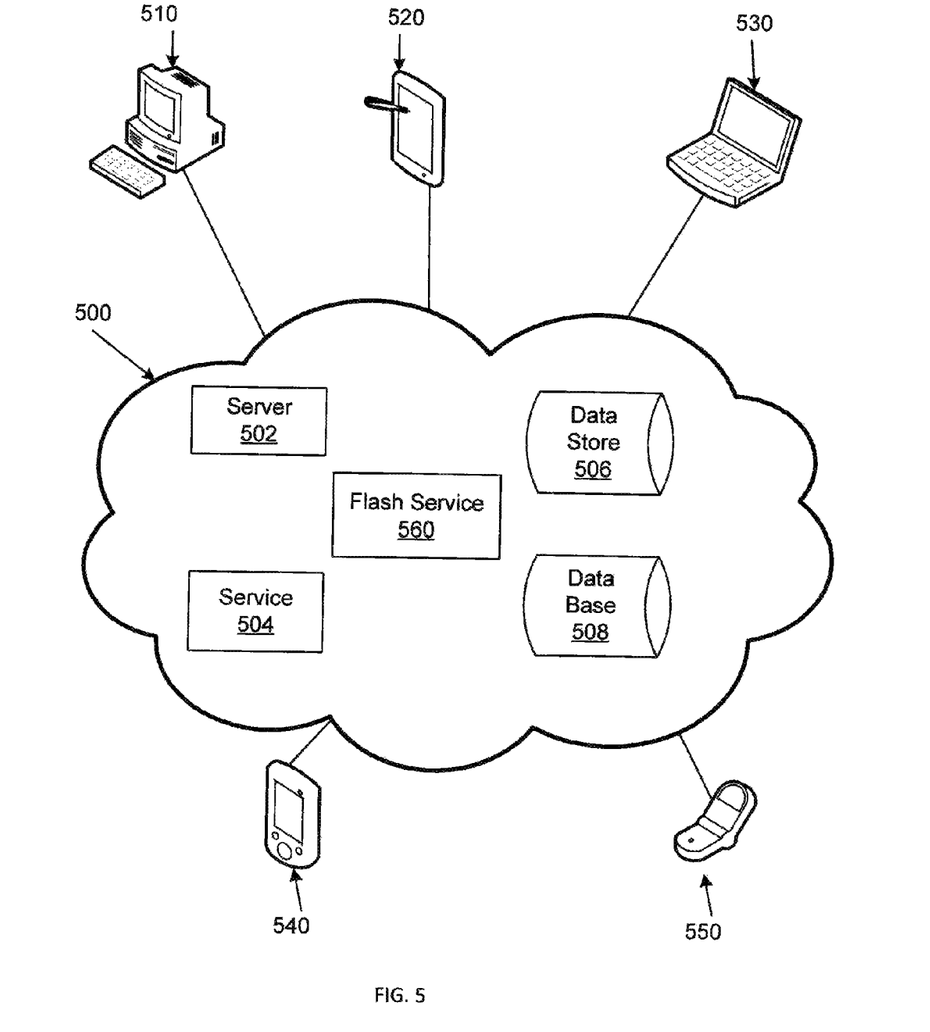
FIG. 5 illustrates an example cloud operating environment.

FIG. 5 illustrates an example cloud operating environment 500. A cloud operating environment 500 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices, over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 5 illustrates an example flash service 560 residing in the cloud 500. The flash service 560 may rely on a server 502 or service 504 to perform processing and may rely on a data store 506 or database 508 to store data. While a single server 502, a single service 504, a single data store 506, and a single database 508 are illustrated, multiple instances of servers, services, data stores, and databases may reside in cloud 500 and may, therefore, be used by the flash service 560.

FIG. 5 illustrates various devices accessing the flash service 560 in the cloud 500. The devices include a computer 510, a tablet 520, a laptop computer 530, a personal digital assistant 540, and a mobile device (e.g., cellular phone, satellite phone) 550. The flash service 560 facilitates controlling a flash for improved image detection. Thus, it is possible that different users at different locations using different devices may access the flash service 560 through different networks or interfaces. In one example, the flash service 560 may be accessed by a mobile device 550. In another example, portions of flash service 560 may reside on a mobile device 550.

Figure 6:
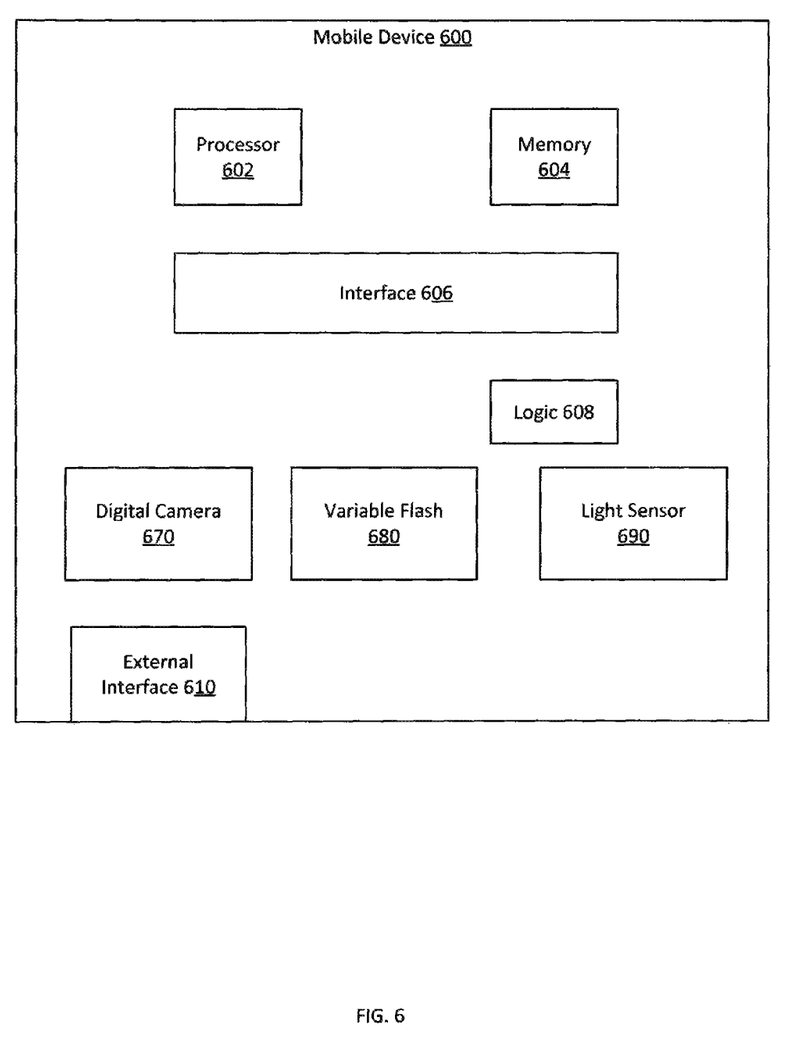
FIG. 6 illustrates an example mobile device configured with a variable flash.

FIG. 6 illustrates an example mobile device 600. Mobile device 600 includes a processor 602, a memory 604, a logic 608, and an external interface 610 that may be connected by an interface 606. Mobile device 600 may be, for example, a cellular telephone, a network telephone, a satellite telephone, or other device.

Generally describing an example configuration of the mobile device 600, the processor 602 may be a variety of various processors including dual microprocessor and other multi-processor architectures. The memory 604 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 604 can store an operating system that controls and allocates resources of the mobile device 600.

The interface 606 may be a single internal bus interconnect architecture or other bus or mesh architectures. While a single bus is illustrated, it is to be appreciated that the mobile device 600 may communicate with various devices, logics, and peripherals using other busses (e.g., PCIE, 1394, USB, Ethernet). The interface 606 can be types including, for example, a memory bus, a memory controller, a peripheral bus, an external bus, a crossbar switch, or a local bus.

The mobile device 600 can operate in a network environment and thus may be connected to a network through network devices via the external interfaces 610. The mobile device 600 may be logically connected to remote computers through the network and the network devices. Through the network, the mobile device 600 may also be connected to services (e.g., flash service 560) provided in the cloud (e.g., cloud 500, FIG. 5). Networks with which the mobile device 600 may interact include, but are not limited to, a local area network (LAN), a wide area network (WAN), a telephony network, a telephony system, a cellular system, a satellite system, and other networks.

Mobile device 600 may include a special purpose logic 608 that is configured to provide a functionality for the mobile device 600. For example, logic 608 may provide a client for interacting with a flash service (e.g., service 560, FIG. 5).

Mobile device 600 may include a digital camera 670 and a variable flash 680. Camera 670 and flash 680 may be controlled by example methods and apparatus described herein to improve image quality. In one embodiment, mobile device 600 may also include a light sensor 690 (e.g., lux meter). While a single camera 670 and single flash 680 are illustrated, in different embodiments mobile device 600 may include one or more cameras, one or more flashes, or combinations thereof.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d, Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, or ABC (e.g., the data store may store only A, only B, only C, A&B, A&C, B&C, or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   accessing a sensor value provided by a light sensor associated with a mobile computing device;
   determining a first control value for a variable flash associated with the mobile computing device as a function of the sensor value, where the first control value is configured to control the mobile computing device to operate the variable flash at a desired illumination level when acquiring a subsequent frame;
   selectively controlling the variable flash based, at least in part, on the first control value;
   accessing a current frame acquired by a camera associated with the mobile computing device; and
   repeating, until a termination condition is met:
   {
   determining one or more imaging metrics for the current frame;
   determining a second control value for the variable flash as a function of the one or more imaging metrics;
   selectively controlling the variable flash based, at least in part, on the second control value;
   accessing a subsequent frame acquired by the camera; and
   treating the subsequent frame as the current frame
   }.

2. The method of claim 1, where the one or more imaging metrics include edge detectability, and brightness.

3. The method of claim 2, comprising:
   accessing a set of hardware locations associated with the mobile computing device, where the set of hardware locations include one or more of, a lens position, a sensor position, and a flash position;
   determining the first control value as a function of the sensor value and the set of hardware locations; and
   determining the second control value as a function of the one or more imaging metrics and the set of hardware locations.

4. The method of claim 1, comprising controlling the mobile computing device to determine the one or more imaging metrics for the frame.

5. The method of claim 1, comprising:
   controlling the mobile computing device to communicate the current frame to a service located external to the mobile computing device;
   controlling the mobile computing device to request that the service compute the one or more imaging metrics; and
   receiving the one or more imaging metrics from the service.

6. The method of claim 1; comprising:
   upon determining that the termination condition indicates that a desired lighting condition cannot be achieved by controlling the variable flash, selectively providing a signal indicating that the desired lighting condition cannot be achieved by controlling the variable flash.

7. An apparatus, comprising:
   a digital camera;
   a variable flash configured to be controllable to operate at a selected illumination level;
   a processor;
   a memory;
   a light sensor;
   a set of logics configured to control the illumination level of the controllable flash; and
   an interface that connects the processor, the memory, and the set of logics,
   the set of logics comprising:
   a first logic configured to identify a current imaging condition experienced by the digital camera based on an input from the light sensor;
   a second logic configured to compute a lux setting for the variable flash as a function of the current imaging condition;
   a third logic configured to control the variable flash as a function of the lux setting; and
   a fourth logic configured to control the digital camera to acquire frames and configured to control the first logic, the second logic, and the third logic to continue to operate until a termination condition is achieved.

8. The apparatus of claim 7, where the first logic is configured to determine the current imaging condition based on a frame acquired by the digital camera.

9. The apparatus of claim 8, where determining the current imaging condition includes determining one or more of, a brightness of the frame, and an edge detectability of the frame.

10. The apparatus of claim 7,
where the first logic is configured to determine the current imaging condition based on a frame acquired from the digital camera,
where determining the current imaging condition includes determining one or more of, a brightness of the frame, and an edge detectability of the frame.

11. The apparatus of claim 7, where the first logic is configured to determine the current imaging condition on the apparatus, and the second logic is configured to determine the lux setting on the apparatus.

12. The apparatus of claim 7, where the first logic is configured to request a determination of the current imaging condition from a service located off the device and where the second logic is configured to request a determination of the lux setting from a service located off the device.

13. The apparatus of claim 7, where the termination condition is achieved when a desired image quality is achieved, and where the fourth logic is configured to control the digital camera to acquire an image using the variable flash at an illumination level determined by the lux level.

14. The apparatus of claim 8, where the termination condition is achieved upon determining that a desired image quality cannot be attained, and where the fourth logic is configured to provide a signal to a user of the apparatus, where the signal indicates that the desired image quality cannot be attained.

* * * * *